United States Patent Office 2,827,423
Patented Mar. 18, 1958

2,827,423

PREPARATION OF ACRYLONITRILE

Erwin L. Carpenter, Stamford, Conn., assignor to American Cyanamid Company, New York, N. Y., a corporation of Maine No Drawing. Application October 5, 1955
Serial No. 538,808

1 Claim. (Cl. 202—57)

This invention relates to the preparation of acrylonitrile. More particularly, it relates to refining crude acrylonitrile prepared by reacting acetylene with hydrocyanic acid in the presence of a catalyst.

In the past few years, commercial interest in acrylonitrile has expanded to the point where it has become one of the most important and promising organic chemical intermediates available. It is a particularly desirable intermediate in the manufacture of a wide range of products, for example, plastics, rubber, synthetic fibers, soil conditioners and the like. For many uses, acrylonitrile must be highly pure, and for this reason strict specifications of purity must be met in the commercial manufacture of acrylonitrile.

In the purification of crude acrylonitrile, it is the usual practice to recover the acrylonitrile content of the reactor gas, produced by reacting acetylene with hydrocyanic acid, by absorbing it in water. The resultant dilute acrylonitrile solution contains, in addition, various impurities, among which may be mentioned HCN, acetaldehyde and lactonitrile. Generally, the dilute aqueous solution is then steam stripped to obtain the acrylonitrile in a more concentrated form. This is then subjected to various refining steps whereby the acrylonitrile content is separated from the impurities.

The presence of both HCN and acetaldehyde constitutes a serious refining problem. Commercial standards with respect to the presence of both in acrylonitrile are extremely rigid. For instance, commercial specifications state that no more than 5 p. p. m. HCN can be present in the final acrylonitrile product. The refining problem, moreover, is aggravated by the fact that lactonitrile becomes less stable at elevated temperatures and tends to dissociate into HCN and acetaldehyde.

A large proportion of the HCN and acetaldehyde content can be separated as lactonitrile in the still bottoms from the above-described steam stripping. However, at the high stripping temperatures employed, lactonitrile dissociates to some extent to HCN and acetaldehyde. These low boiling products are stripped overhead with the acrylonitrile. The overheads may then be further treated by various physical and/or chemical purification steps designed to reduce the HCN and acetaldehyde contents by removing them as such or in the form of lactonitrile.

A serious disadvantage of removing much of the HCN and acetaldehyde as lactonitrile in the aqueous bottoms from steam stripping is that these bottoms are eventually discharged in commercial practice with the plant effluent. This creates a disposal problem, since lactonitrile is extremely toxic. Accordingly, the plant effluent must be subjected to a far more severe predisposal treatment prior to discharge than would otherwise be practiced. Additionally, such disposal represents an excessive loss of HCN.

There has remained, therefore, a demand for a purification procedure for crude acrylonitrile whereby HCN and acetaldehyde may be removed to within specification limits without, at the same time, contaminating the steam stripping effluent with lactonitrile and/or HCN. It is the primary object of this invention to fulfill this demand.

In the acrylonitrile solution, at room temperature, the system $CH_3CHOHCN \rightleftharpoons CH_3CHO + HCN$ is at equilibrium far on the lactonitrile side. At elevated temperatures, i. e., 100° C., dissociation to HCN and acetaldehyde is considerably greater. This system, moreover, approaches equilibrium much more rapidly in an aqueous acrylonitrile soution under substantially neutral to alkaline conditions than under acid conditions. The process of this invention takes advantage of this rate factor and thereby meets the objects of this invention in an unusually effective, yet surprisingly simple, manner.

In general, the process of this invention can be quite simply stated. The solution of acrylonitrile in water obtained from scrubbing the reactor gas is adjusted to an optimum hydrogen ion concentration for steam stripping. At the steam stripping temperature, the lactonitrile content partially dissociates to acetaldehyde and HCN. These, being low boiling compounds, are stripped overhead with the acrylonitrile. At the adjusted hydrogen ion concentration, the system continues to rapidly approach the equilibrium upset by stripping of acetaldehyde and HCN, so that within the time required to completely strip the acrylonitrile content from any given unit of feed to the stripper, the lactonitrile content, as well as any free HCN and acetaldehyde, can likewise be substantially completely stripped. The stripped impurities may then be separated from the acrylonitrile by means which form no part of this invention.

The solution of acrylonitrile in water obtained by scrubbing the reactor gas is acidic, the pH being above 3. In accordance with the process of this invention, the hydrogen ion concentration of the solution must be adjusted. It has been found that the rate at which equilibrium is approached in an aqueous acrylonitrile solution of the system $CH_3CHOHCN \rightleftharpoons CH_3CHO + HCN$ is sufficiently fast for the purpose of this invention at a pH higher than about 6. Adjustment of the hydrogen ion concentration of the solution generally will not be beyond a pH of about 9 and preferably will be from about 6.5–8.

Adjustment of the pH may be readily made by the addition of any of various alkaline materials, such as the hydroxides, phosphates, borates and carbonates of the alkali and alkali earth metals and ammonia, and the like. Addition of the alkaline material may be conveniently made at any of various stages prior to stripping. Preferably, addition is made at the time of scrubbing of the reactor gas, but the alkaline material may also be directly added to the stripping column, or at any point between the scrubber and the stripping column.

On condensation, the stripped overheads stratify into a lower water layer containing some acrylonitrile and an upper acrylonitrile layer containing some water in addition to various other impurities including lactonitrile, acetaldehyde, HCN and the like. The water layer may be returned as reflux to the stripping column and the acrylonitrile layer further treated in a manner which forms no part of this invention to obtain a purified acrylonitrile product.

The process of this invention is further explained by the following examples, which are intended to be illustrative only and not by way of limitation. All parts are by weight unless otherwise indicated.

*Example 1*

An aqueous acrylonitrile solution obtained by scrubbing with water a gas from the reaction of HCN with acetylene and having a total HCN concentration of 2140 p. p. m. of which 1140 p. p. m. is as free HCN and the remainder is in the form of lactonitrile, is adjusted to a pH of 6.3 by the addition of a 0.5 N NaOH solution. The adjusted solution is stripped with steam over a period of 20 minutes at 100° C. After stripping, the concentration of HCN in the column bottoms, either in the form of lactonitrile or as free HCN, is found to be only 78 p. p. m.

*Example 2*

An aqueous acrylonitrile solution similar to that of Example 1 but having a total HCN concentration of 2520 p. p. m. of which 1560 p. p. m. is as free HCN and the remainder is in the form of lactonitrile, is adjusted to a pH of 7.0. After stripping with steam for 20 minutes, the HCN concentration in the column bottoms, either in the form of HCN or in the form of lactonitrile, is found to be 77 p. p. m.

*Example 3*

An aqueous acrylonitrile solution similar to that of Example 1 but having a total HCN concentration of about 5000 p. p. m., of which 3550 p. p. m. is as free HCN and the remainder is in the form of lactonitrile, is continuously neutralized to a pH of 6.0-8.0 by addition of caustic soda and continuously stripped in a distillation column operated at essentially atmospheric pressure. The water effluent from the bottom of the column is found to contain only 10 p. p. m. HCN either in the form of lactonitrile or as free HCN.

*Example 4*

To show the effect of improper pH adjustment Example 2 is repeated except that the hydrogen ion concentration is adjusted to a pH of 4.9. After stripping, the HCN concentration in the column bottoms, either as free HCN or as lactonitrile, is found to be 546 parts.

I claim:

In refining crude acrylonitrile in which a dilute aqueous acrylonitrile solution, obtained by scrubbing with water a gas from the reaction of hydrogen cyanide and acetylene, containing acetaldehyde, hydrogen cyanide and lactonitrile is subjected to distillation whereby acrylonitrile is recovered as a concentrated solution, the improvement in combination therewith which comprises: maintaining the hydrogen ion concentration of said solution during distillation at a pH of about 6-9 whereby substantially all lactonitrile is dissociated and taken overhead as acetaldehyde and hydrogen cyanide with the acrylonitrile and a substantially lactonitrile-free residue is obtained.

References Cited in the file of this patent

UNITED STATES PATENTS

| | | |
|---|---|---|
| 2,351,157 | Semon | June 13, 1944 |
| 2,527,660 | Spillane | Oct. 31, 1950 |
| 2,653,966 | Taylor et al. | Sept. 29, 1953 |